US012791010B2

(12) United States Patent
Brenner et al.

(10) Patent No.: US 12,791,010 B2
(45) Date of Patent: Nov. 10, 2026

(54) DEVICE FOR IDENTIFYING AN ACCUMULATION OF ICE ON ROTOR BLADES OF A WIND TURBINE AND METHOD FOR TEACHING SUCH A DEVICE

(71) Applicant: Weidmüller Monitoring Systems GmbH, Dresden (DE)

(72) Inventors: Daniel Brenner, Dresden (DE); Christian Kühnert, Dresden (DE); Stefan Reimann, Dresden (DE)

(73) Assignee: WEIDMÜLLER MONITORING SYSTEMS GMBH, Dresden (DE)

( * ) Notice: Subject to any disclaimer, the term of this patent is extended or adjusted under 35 U.S.C. 154(b) by 118 days.

(21) Appl. No.: 18/005,502

(22) PCT Filed: Jul. 7, 2021

(86) PCT No.: PCT/EP2021/068799
§ 371 (c)(1),
(2) Date: Jan. 13, 2023

(87) PCT Pub. No.: WO2022/013032
PCT Pub. Date: Jan. 20, 2022

(65) Prior Publication Data

US 2023/0272783 A1 Aug. 31, 2023

(30) Foreign Application Priority Data

Jul. 15, 2020 (DE) ......................... 102020118646.0

(51) Int. Cl.
*F03D 80/40* (2016.01)
*F03D 7/04* (2006.01)
*F03D 17/00* (2016.01)

(52) U.S. Cl.
CPC ............. *F03D 80/40* (2016.05); *F03D 7/046* (2013.01); *F03D 17/021* (2023.08);
(Continued)

(58) Field of Classification Search
CPC ............................... F03D 17/00; F03D 17/017
See application file for complete search history.

(56) References Cited

U.S. PATENT DOCUMENTS 8,200,451 B2 * 6/2012 Battisti .................. B64D 15/20
702/50
9,518,561 B2 * 12/2016 De Boer ................ F03D 80/60
(Continued)

FOREIGN PATENT DOCUMENTS

CN 107100802 A 8/2017
CN 109973332 A * 7/2019
(Continued)

OTHER PUBLICATIONS

English translation of DE102010015595A1 (Year: 2011).*
(Continued)

*Primary Examiner* — Courtney D Heinle
*Assistant Examiner* — Wesley Le Fisher
(74) *Attorney, Agent, or Firm* — Laubscher & Fretwell P.C.

(57) ABSTRACT

A method for identifying an accumulation of ice on at least one rotor blade of a wind turbine includes a number of steps. First, operating and ambient conditions during operation of the wind turbine are determined. An electrical output of the wind turbine that is to be expected under the operating and ambient conditions is determined. An electrical output that is actually generated by the wind turbine is measured, and the expected electrical output of the wind turbine is compared with the electrical output actually generated by same. Depending on the result of the comparison, whether the at least one rotor blade is free of ice is determined with a high level of probability and vibrations of the at least one rotor blade are detected. Characteristic properties of the vibrations are detected and stored as a reference for the device for identifying an accumulation of ice, if, in the comparison, it
(Continued)

was determined with a high level of probability that the at least one rotor blade is free of ice. A device for identifying an accumulation of ice on at least one rotor blade of a wind turbine is designed to carry out a method of this kind.

12 Claims, 4 Drawing Sheets

(52) U.S. Cl.
CPC ............ *F03D 80/405* (2023.08); *F03D 17/00* (2016.05); *F03D 17/017* (2023.08); *F05B 2270/334* (2013.01); *F05B 2270/335* (2013.01)

(56) References Cited

U.S. PATENT DOCUMENTS

| | | | | |
|---|---|---|---|---|
| 10,018,184 | B2 * | 7/2018 | Domke | F03D 17/00 |
| 10,062,272 | B2 * | 8/2018 | Magnus | G08B 29/14 |
| 10,865,778 | B2 * | 12/2020 | Müller | F03D 17/00 |
| 10,982,657 | B2 * | 4/2021 | Gregory | F03D 7/024 |
| 11,703,035 | B2 * | 7/2023 | Arlaban Gabeiras | F03D 7/0224 416/1 |
| 11,946,452 | B2 * | 4/2024 | Hong | F03D 7/0224 |
| 12,012,937 | B2 * | 6/2024 | Bertelsen | F03D 17/00 |
| 2012/0134804 | A1 | 5/2012 | Magnuson | |
| 2016/0027294 | A1 * | 1/2016 | Magnus | F03D 80/40 340/514 |
| 2019/0323485 | A1 * | 10/2019 | Gregory | F03D 7/024 |
| 2019/0368472 | A1 * | 12/2019 | Müller | G08B 19/02 |
| 2021/0340963 | A1 * | 11/2021 | Muñoz Babiano | F03D 17/00 |

FOREIGN PATENT DOCUMENTS

| | | | | |
|---|---|---|---|---|
| DE | 10323785 | B4 | 9/2009 | |
| DE | 102010015595 | A1 * | 10/2011 | F03D 7/042 |
| DE | 102011077129 | A1 | 12/2012 | |
| DE | 102016124554 | A1 | 6/2018 | |
| DE | 102017006191 | A1 | 1/2019 | |
| DE | 102017129112 | A1 | 6/2019 | |
| DE | 102018116941 | A1 | 1/2020 | |
| DE | 102019106073 | A1 | 9/2020 | |
| WO | 2004104412 | A1 | 12/2004 | |

OTHER PUBLICATIONS

English translation of CN109973332A (Year: 2019).*

Sudhakar Gantasala, "Detection of blade icing and its influence", Sep. 2019, Lulea University of Technology, (Year: 2019).*

Gantasala Sudhakar et al., "Detection of blade icing and its influence on wind turbine vibrations", Retrieved from the Internet: http://www.diva-portal.org/smash/getdiva2:1362758/FULLTEXT01.pdf, Jan. 1, 2019.

* cited by examiner

DEVICE FOR IDENTIFYING AN ACCUMULATION OF ICE ON ROTOR BLADES OF A WIND TURBINE AND METHOD FOR TEACHING SUCH A DEVICE

This application is a 0 371 national stage entry of international patent application No. PCT/EP 2021/068799 Filed Jul. 7, 2021 which claims priority of patent application No. DE 102020118646.0 filed Jul. 15, 2020. The entire content of these application is incorporated herein by reference.

BACKGROUND OF THE INVENTION

The invention relates to a method for teaching a device for identifying an accumulation of ice on rotor blades of a wind turbine, wherein ice is detected on the basis of natural vibration measurements of the rotor blades. The invention further relates to such a device for detecting an accumulation of ice, hereinafter also referred to as an ice detection device.

The evaluation of vibrations of a rotor of a wind turbine either via vibration transducers arranged in the rotor blade itself and/or via vibration transducers arranged on components connected to the rotor blade, such as a drive train or a nacelle of the wind turbine, is an effective way for detecting the accumulation of additional masses and in particular ice on the rotor blade. Ice can accumulate on rotor blades in large quantities, ranging up to the tens or hundreds of kilograms (kg). To avoid hazards from falling or thrown-off ice and to prevent damage to the drive train of the wind turbine, reliable detection of accumulated ice is of utmost interest.

BRIEF DESCRIPTION OF THE PRIOR ART

The printed publication DE 10 2016 124 554 A1 describes a method for identifying ice on a rotor blade of a wind turbine, in which a change in the natural frequency is used to infer ice accumulation. In order to achieve reliable detection results, this method is combined with measurement results from sensors that can be used to directly infer an accumulation of ice. Such sensors are, for example, conductivity sensors on the surface of the rotor blade or optically or acoustically operating sensors that can determine a layer thickness of an accumulation of ice. The disadvantage of this combined method is that ice is only detected locally and directly in the area of the sensor and that, in addition to vibration transducers, further sensors must be arranged directly on the rotor blade, which require high maintenance due to their position.

In the printed publication WO 2004/104 412 A1, an operating parameter of a wind turbine, in particular the power it produces, is recorded as a function of boundary conditions such as wind speed and compared with previously known values for this operating parameter. This is based on the knowledge that an accumulation of ice leads to a reduction in the power output of the wind turbine. If the actual power produced by this turbine is known at a give wind speed, a comparison of the current power delivered at a known wind speed may indicate an accumulation of ice. Comparison values of the turbine in question are required to perform the method with sufficient validity.

According to the printed publication DE 10 2017 129 112 A1, the detection reliability of the method described in the previously mentioned printed publication WO 2004/104 412 A1 is increased by using it in combination with another method for detecting ice. Each of the methods used issues a warning when there is a certain probability of an accumulation of ice. Each of the methods may further output a signal indicating with a certain probability that the system is free of ice. An intervention in the operation of the wind turbine, such as slowing down the wind turbine, occurs as soon as one of the systems outputs a warning signal with respect to a posse accumulation of ice. As soon as one of the systems subsequently emits an ice-free signal, the intervention in the operation of the wind turbine is deactivated again. In this way, the effects of a possibly unjustified intervention in the operation of the wind turbine are reduced. A disadvantage is that operation may be impaired, even if an accumulation of ice is not predicted with certainty, for example, if only one of two systems detected has accumulation of ice.

When using ice warning systems based on an evaluation of the natural vibration of the blade, it has been shown that high detection reliability can be achieved if reliable reference data, e.g. in the form of reference spectra, are available on the vibration behavior of the blades in an ice-free condition for difference operating and ambient conditions (e.g. wind speed, outside and/or blade temperature, rotor speed, blade pitch angle).

If a wind turbine is installed in a cold season and a region prone to icing, it must be ensured that the rotor blades of the wind turbine are free of ice in order to record the reference spectra. One known option is to wait for a minimum outside temperature, for example at least before recording reference spectra. Depending on the region and season, however months may pass before such a condition is met. Within this time, the ice detection device actually intended for the wind turbine cannot be used or cannot be used reliably.

SUMMARY OF THE INVENTION

It is an object of the present invention to specify a learning method of the type mentioned above, which enables reliable operation of the device for ice detection, even if it is not possible to conclude that there is no ice on the basis of the ambient temperature. It is a further object to specify a device for ice detection which can be calibrated accordingly.

A method according to the invention of the type mentioned above has the following steps: operating and ambient conditions during operation of the wind turbine are determined, and an expected electrical output of the wind turbine under specific operating and ambient conditions is determined. During Operation of the wind turbine, an actual electrical output generated by the wind turbine is measured and compared to the expected electrical output generated by wind turbine. Depending on a result of the comparison, it is determined whether the at least one rotor blade has a high probability of being free of ice. If it is determined in the comparison that there is a high probability that the at least one rotor blade free of ice, vibrations of the at least one rotor blade are detected and their characteristic properties are detected and stored, wherein the characteristic properties serve as a reference for the device for detecting an accumulation of ice.

According to the invention, a further method for ice detection is thus used to detect ice-free conditions with at least a high probability. With the method according to the application, the duration of the learning phase can be shortened, since, under certain circumstances, a vibration reference for the ice detection device can be recorded after the output comparison has been darned out, even an absence of ice cannot be derived from the ambient temperature (outside temperature). As a further method to detect if the blades are free of ice, the power output of the turbine at given operating conditions is used. This is advantageous because it allows a statement about the ice-free condition to be made without the need for additional sensors. Current actual output data are usually available.

In the context of the application, a "high probability" of detecting ice-free conditions is understood be a probability of, for example, more than about 80%.

In an advantageous design of the method, the operating and ambient conditions include a wind speed, an ambient and/or blade temperature an angle of attack of at least one rotor blade, and/or a rotational speed of a rotor of the wind turbine. The expected electrical output is advantageously determined using a model that reflects measured power at measured operating and ambient conditions. A comparison of expected power output actual power output can well achieve a sufficient level of significance for the statement "ice-free" when the expected power output is determined based on a model. Preferably, the model is based on output data measured at the actual wind turbine itself. Alternatively, it is also possible to measure the performance of a wind turbine comparable to the wind turbine and to base the model on this data.

In a further advantageous design of the method, a quotient between the actually generated electrical output and the expected electrical output of the turbine is formed in the comparison step and compared with a predefined threshold value. If the threshold value is exceeded, it is assumed that the at least one rotor blade is ice-free. Preferably, the threshold value is between 60% and 95% and in particular between 80% and 95%.

A frequency and/or amplitude of at least one vibration state, e.g. of a maximum in a vibration spectrum, can be used as characteristic properties of the vibrations which are stored as a reference and to which the detection device refers. It is also conceivable that the characteristic properties of the vibrations relate to at least one frequency range from spectrum of the vibration. In this case, the vibration spectrum or a section thereof is stored as a reference spectrum.

A device according to the invention for detecting an accumulation of ice on at least one rotor blade of a wind turbine detects ice on the basis of natural vibration measurements on the at least one rotor blade and is characterized in that the device is adapted for carrying out such a teaching process. The advantages mentioned in connection with the teaching method are obtained.

BRIEF DESCRIPTION OF THE FIGURES

The invention is explained in more detail below by means of an exemplary embodiment with the aid of the accompanying figures, wherein.

DETAILED DESCRIPTION

Figure 1:
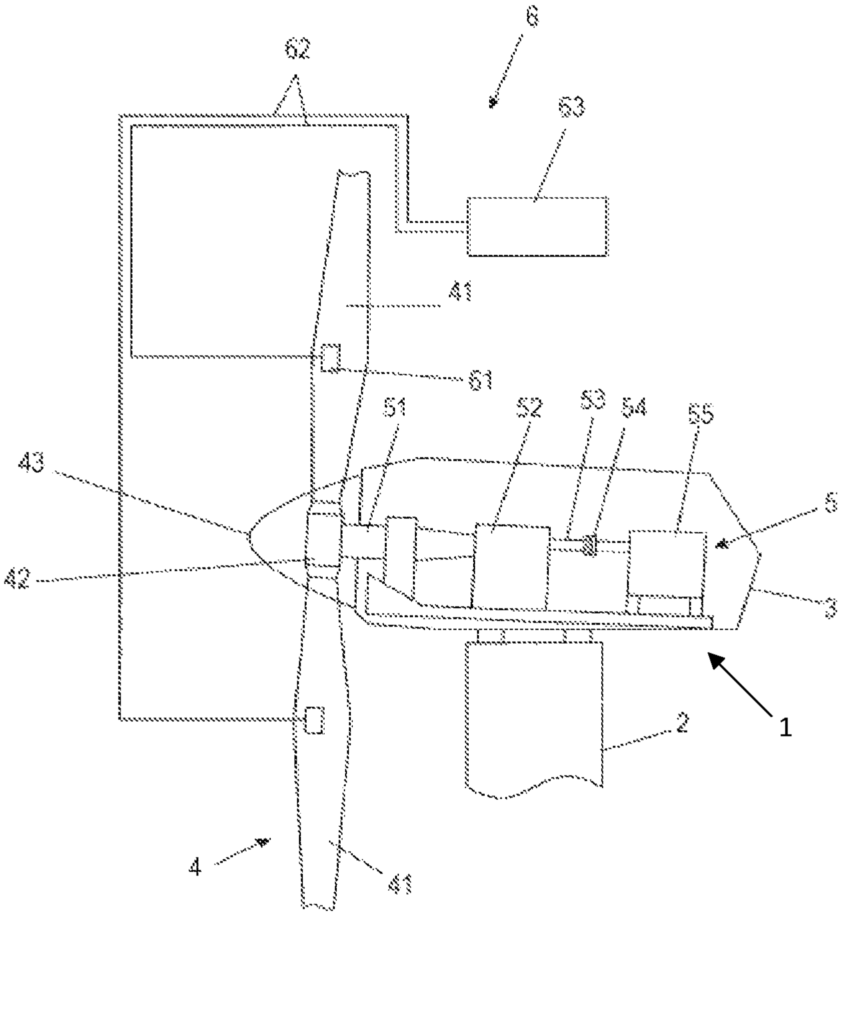
FIG. 1 is a schematic sectional view of a part of a wind turbine.

FIG. 1 is an exemplary sectional drawing of a part of a wind turbine 1 which has a device 6 for identifying an accumulation of ice on a rotor blade. The wind turbine 1 shown in FIG. 1 is suitable and adapted for carrying out a teaching method for the device 6 in accordance with the application. The device 6 is hereinafter also referred to as ice detection device 6.

The wind turbine 1 has a nacelle 3 rotatably mounted on a tower 2 and carrying a rotor 4. The rotor 4 has at least one rotor blade 41, which is connected to a rotor shaft 51 at a hub 42. The area of the hub 42 and the attachment of the rotor blades 41 is covered by a spinner 43.

FIG. 1 shows an example of two rotor blades 41 cut to length. This is purely exemplary; wind turbines often have three rotor blades 41.

The aforementioned rotor shaft 51 is part of a drive train 5. It transmits the rotary motion of the rotor 4 to a gearbox 52, which in turn is coupled via a gear shaft 43 and a coupling 54 to a generator 55, which converts the mechanical energy of the rotor 4 into electrical energy. The illustration of the wind turbine 1 with gearbox 55 is also purely exemplary. The device according to the application and the method according to the application can just as well be implemented with a gearless wind turbine.

The ice detection device 6 for detecting an accumulation of ice on one or more of the rotor blades 41 includes at least one vibration transducer 61, hereinafter abbreviated as sensor 61.

A sensor 61 is arranged in each of the rotor blades 41 shown. Each sensor 61 is connected to an evaluation unit 63 via a sensor line 62. The type of connection is shown in FIG. 1 purely by way of examples. As a rule, a connection between the sensors 61 and the evaluation unit 63 is made via sensor lines extending in the rotor blade 41 up to the spinner 43, from where a generally wireless transmission to the evaluation unit 63 takes place. In alternative designs, the sensors 61 can be coupled to energy harvesting units ("energy harvesting") so that they draw energy, for example, form the rotation of the rotor 4 and transmit data directly from the rotor blade 41 to the evaluation unit 63 via radio. It is also conceivable to supply energy to the sensors 61 via optical fibers within the rotor blades 41, as well as to transmit data optically from the sensors 61 to the evaluation unit 63 or at least to a radio relay station in the spinner 43.

The sensors 61 are vibration transducers that detect a vibration of the rotor blade 41. The sensors 61 may be acceleration sensors, strain sensors, or rate-of-rotation sensors. A vibration is then detected as a change in a measured acceleration value, a measured velocity, or a measured extension. The arrangement of the sensors 61 within the rotor blade 51 can be such that vibrations are detected in the pivoting direction ("edge") and/or in the flapping direction ("flap") and/or in the torsional direction of the respective rotor blade 41.

Purely by way of example, the two sensors 61 shown in FIG. 1 are arranged approximately in a lower third of the rotor blade 41. However, the sensors 61 can also be arranged at other positions in the rotor blade 41. Furthermore, it is possible to arrange several sensors 61 in each rotor blade 41, which are evaluated together or independently or each other.

Further, it is possible to detect vibrations of the rotor blades 41 also at other components of the wind turbine 1, where corresponding vibration sensors are then arranged. For example, sensors can be arranged in the hub 42 and/or along the drive train 5, wherein vibrations of the rotor blade 41 that show up in these sensors can be distinguished on the basis of, for example, their frequency range from inherent vibrations at the drive train 5, for example due to gear meshing in the gearbox 42.

Figure 2:
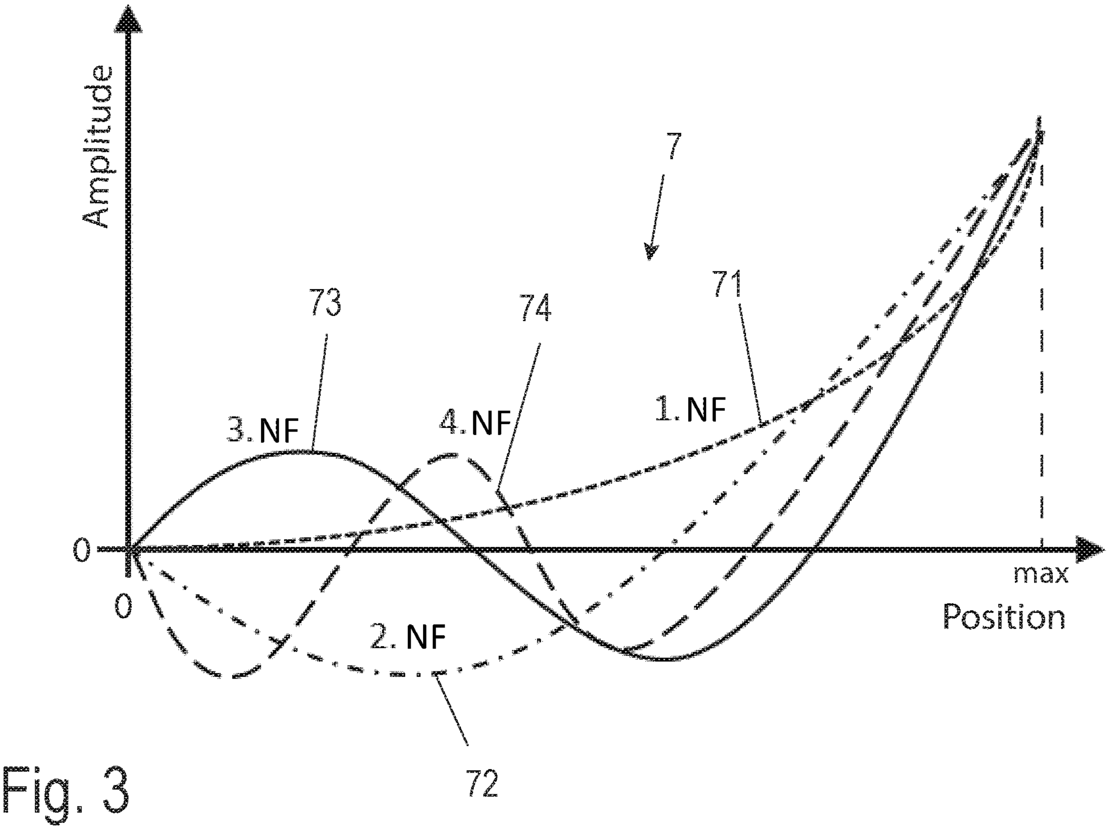
FIG. 2 is a graph showing the natural frequency conditions of a wind turbine rotor blade.

FIG. 2 shows a schematic diagram of possible vibrations states 7 of a rotor blade, for example one of the rotor blades 41 according to FIG. 1. A vibration amplitude on the vertical axis of the diagram is shown as a function of a position along the rotor blade eon the horizontal axis.

Each of the curves 71-74 represents an instantaneous deflection characteristic of the respective vibration state 7. The position "0" on the horizontal axis corresponds to the position of the blade root and the positions "max" on the horizontal axis corresponds to the position of the blade tip.

In FIG. 2, four vibration states 7 are shown, a fundamental state in curve 71, a first harmonic in curve 72, which is characterized by one vibration node along the extension of the rotor blade, a second harmonic in curve 73, which is characterized by two vibration nodes, and a third harmonic in curve 74, which is characterized by three vibration nodes along the rotor blade. Further, the fundamental vibration according to curve 71 is referred to as the first natural frequency state, and the first, second and third harmonics are referred to as the second, third and fourth natural frequency states.

FIG. 2 shows transverse vibrations, i.e. vibrations in the pivoting or flapping direction of the rotor blade. A comparable picture also results for torsional vibrations, i.e. rotations of the rotor blade around its longitudinal axis.

During operation of the ice detection device 6, the time-dependent vibration displacement derived from its measurement signals is recorded for each of the sensors 61 for a certain period of time.

Preferably, an amplitude spectrum is then determined from the vibration recorded in the time domain. The transformation into the frequency domain, i.e. the representation as a spectrum, can be performed, for example, by means of a Fast Fourier Transform (FFT) or a wavelet transform. Alternatively, instead of a transformation into the frequency domain, natural frequency states can also be determined in the time domain by means of appropriate filtering or stochastic methods, for example by means of so-called "stochastic subspace identification" (SSI).

Figure 3:
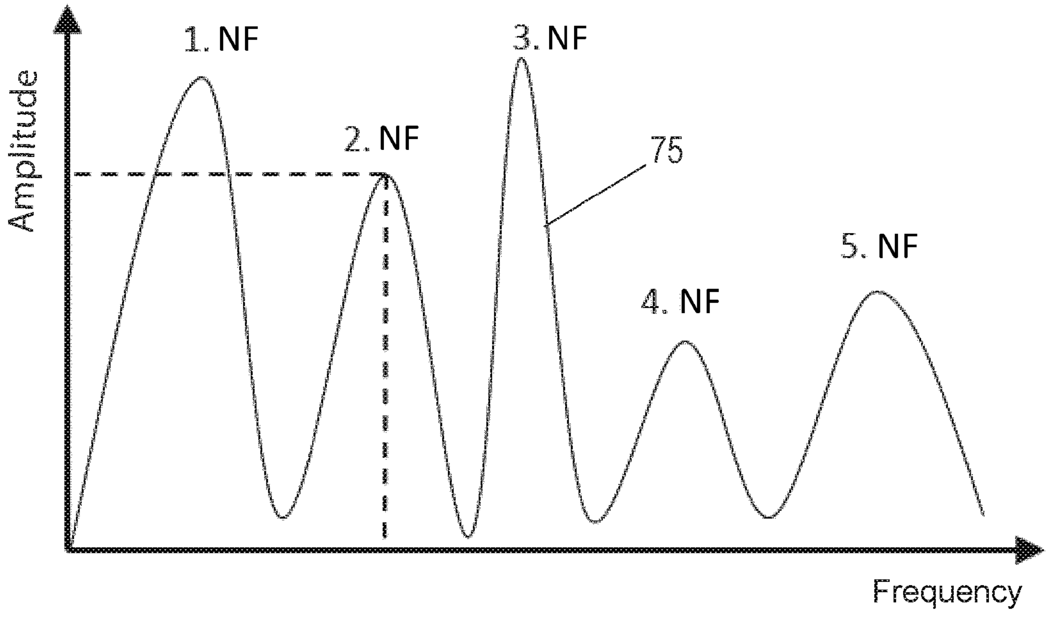
FIG. 3 is a graphical representation of an amplitude spectrum of vibration states of a rotor blade of a wind turbine.

FIG. 3 shows a spectrum transformed, for example via FFT, from the vibration recordings in the time domain into the frequency domain in a spectral curve 75. On the vertical axis, the amplitude of the vibration is shown as a function of the frequency plotted on the horizontal axis.

In this representation, natural frequency states can e easily identified as maxima of the spectral curve 75. The assignment of the maxima to the different natural frequency states is possible by the ascending frequency.

The described vibration measurement and formation of a spectrum is repeated at regular time intervals. The natural frequency states determined from the spectrum according to FIG. 3 changes as a result of an accumulation of ice. These are characterized by their frequency and an associated maximum amplitude. To detect an accumulation of ice, a currently measured spectrum is compared with a reference spectrum previously recorded in an ice-free state. Deviations above a specified value indicate an accumulation of ice, and the specified value can be chosen to be of varying magnitude to indicate an accumulation of ice with varying levels of significance. Preferably, the current spectrum is compared with the reference spectrum over the entire accessible frequency range. However, it is also conceivable to evaluate only certain frequency ranges or to consider them in the comparison, up to a selective evaluation at only one frequency or several selected frequencies.

Regardless of which frequency range is considered in the comparison, it is necessary for reliable detection of an accumulation of ice to have a reference available, e.g. in the form of a reference spectrum, which was recorded in an ice-free condition of the rotor blade 41 and which characterizes the vibration behavior in the ice-free condition. It is usually provided to use a set of different reference spectra recorded at different conditions, i.e., for example, different speeds or ranges of speeds of the rotor of the wind turbine. Again, there is a need for the reference spectra to have been recorded in an ice-free condition of the rotor blades. The recording of the reference spectrum or spectra is referred to as the teaching method.

In order to get the ice detection device ready for use a quickly as possible after an installation of a wind turbine with an ice detection device for detecting an accumulation of ice or after a retrofit of such an ice detection device, an ice-free state of the rotor blades of the wind turbine is detected in the teaching method according to the application irrespective of an outside temperature. In case of an increased outside temperature, for example an outside temperature above 5° C., an ice accumulation can be excluded. Conversely, however, an accumulation of ice is not necessarily present just because the outside temperature is below this value. In the method according to the invention, therefore, an indicator for an absence of ice that is independent of the outside temperature is used in order to possibly already be able to record reference spectra even at a lower outside temperature.

The teaching method is based on a comparison of an electrical output produced by the wind turbine with an expected electrical output. The quotient of the produced electrical output and the expected electrical output is also called the efficiency of the wind turbine. To determined the efficiency, the operating conditions of the wind turbine must be taken into account, in particular a wind speed and possibly also an ambient and/or blade temperature.

Figure 4:
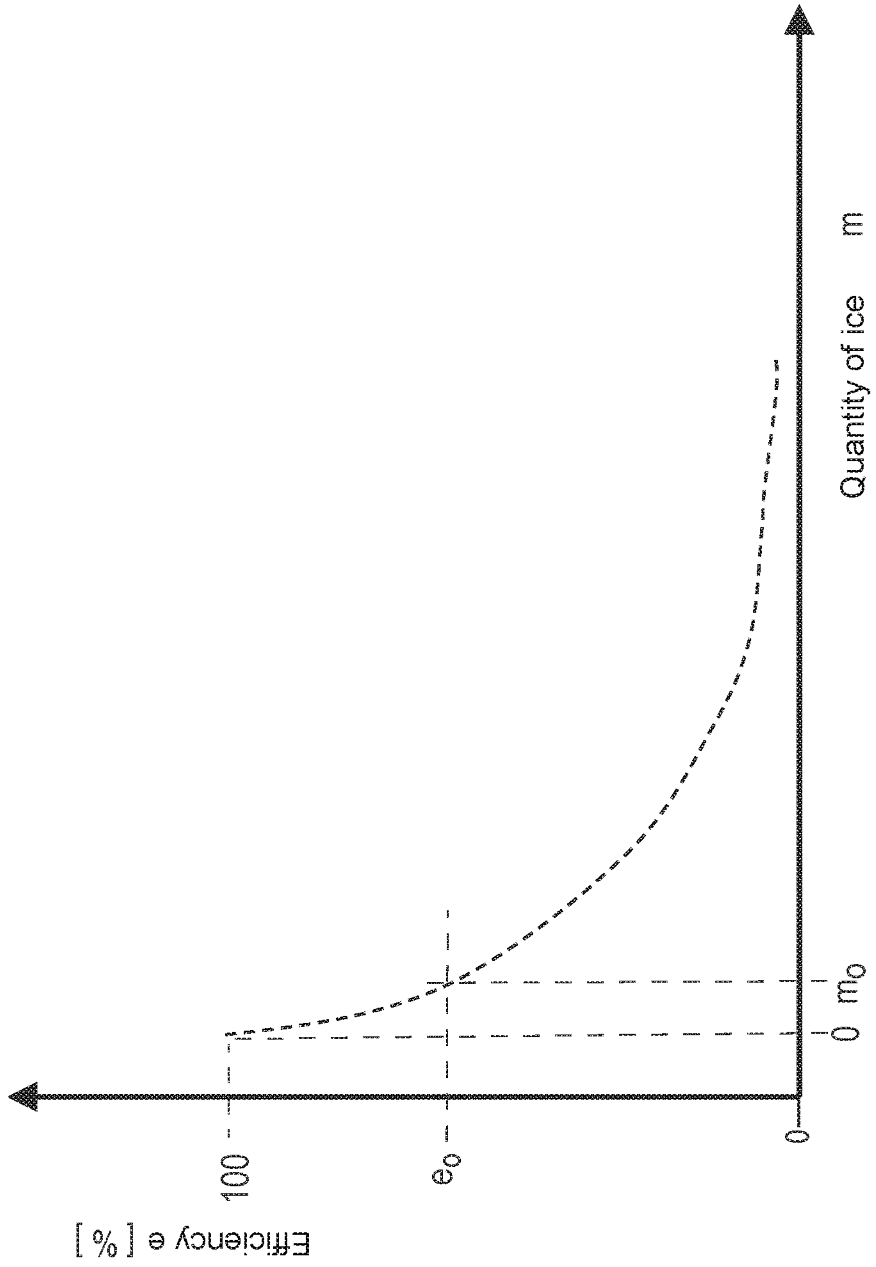
FIG. 4 is a graph showing the influence of an accumulation of ice on wind turbine efficiency; and FIG. is a flow chart of a method for teaching a deice for detecting an accumulation of ice on a rotor blade.

FIG. 4 shows in the form of a graphical diagram a dependence of an efficiency e, i.e. the quotient between actually produced an expected electrical output, depending on a amount of ice m on the rotor of the wind turbine. In the schematic diagram, the amount of ice m is shown increasing to the right on the horizontal axis in arbitrary units. The efficiency e is shown on the vertical axis in a value range from 0 to 100%. The diagram shows the decrease in efficiency from a value of 100% with an ice-free rotor as the amount of ice m increases. A predefined threshold value $e_0$ of the efficiency e is plotted, which in the example shown is about 65%. If the efficiency e of the wind turbine is above this threshold value $e_0$, it can be assumed that no or only a very small amount of ice $m_0$ is present on the rotor. If such an operating state is identified, recorded vibration spectra of the monitoring device can be regarded as reference spectra and stored accordingly.

Figure 5:
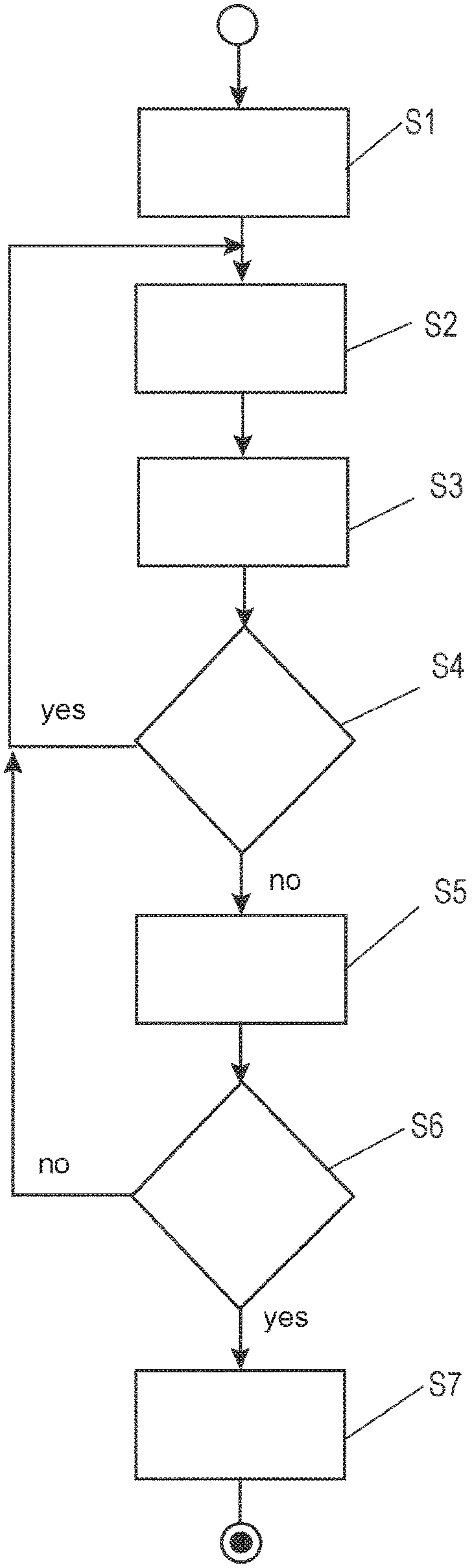

FIG. 5 shows an exemplary embodiment of a teaching method in more detail in the form of a flow chart. The method shown in FIG. 5 can be carried out, for example, with the wind turbine 1 according to FIG. 1 and is therefore explained below by way of example with reference to FIG. 1.

In a first step S1, a model is created for the wind turbine, e.g. the wind turbine 1 according to FIG. 1, which creates a power output to be expected under difference operating conditions, such as wind speed, temperature, rotational speed of the rotor 4 with ice-free rotor blades 41 and angle of attack of the rotor blades 41. Preferably, existing measured values recorded for an already installed wind turbine of the same type are used as a basis. IF the monitoring device 6 is retrofitted, previously recorded measured values at the specific wind turbine 1 can also optionally be used. If measured values are not available over the entire required parameter range of the operating and ambient conditions, the range can be extended from measured values by regression calculation.

In a next step S2, the operating and ambient conditions at the wind turbine 1 during operation on which the model is based are determined.

In a subsequent step S3, the operating ambient conditions measured in step S2 can be used to estimate the expected power output of the wind turbine 1 from the model generated in step S1.

In the following step S4, a difference between the actually measured and the expected power output is determined, preferably as a ratio, optionally also as a difference in other exemplary embodiments. The ratio corresponds to the efficiency e of the wind turbine shown in FIG. 3. Further, in step S4 the determined efficiency e is compared with a predetermined threshold value $e_0$. Possible threshold values are in the range of about 60-95%. Falling below the threshold value $e_0$ indicates that the rotor blades 41 are not free of ice. In that case, the method branches back to step S2 to determine operating parameters again and to perform a power measurement. Since an ice-free condition does not change within a very short time, a pause of e.g. several hours ban be provided before the method repeats steps S2 ff.

If, on the other hand, it is determined in step S4 that the predetermined threshold value $e_0$ for the efficiency e has been exceeded, the method continues with a step S5 in which vibrations of the rotor blades 41 are recorded by the monitoring device 6 with the aid of the sensors 61, the spectrum of which is stored as a reference spectrum for the operating and ambient conditions recorded in step S2.

In step S6 it is then checked whether reference spectra are available in sufficient quantity and quality for a sufficiently large range of operating and ambient conditions. If this not the case, the method branches back again to step S2 in order to be able to record further reference spectra at other operating and ambient conditions—again, optionally, after a waiting time. If it is determined in step S6 that a sufficiently large and qualitatively suitable set of reference spectra is available, the teaching phase for the monitoring device 6 is completed and the monitoring device 6 can be operated in regular monitoring mode in step S7.

The method shown can be combined with a known teaching method in which reference spectra are recorded when the outside temperature is so high, for example above 5° C., that it can be assumed with a high probability that the rotor blades 41 are free of ice.

The method according to the application can shorten the duration of the teaching phase, since reference spectra for the monitoring device can possibly be recorded after the performance comparison has been carried out even if an ice-free condition cannot be derived from the outside temperature.

The invention claimed is:

1. A method for identifying an accumulation of ice on at least one rotor blade of a wind turbine, comprising the steps of (a) monitoring operating and ambient conditions during operation of the wind turbine in a presumptive ice-free state;

(b) calculating an expected electrical output of the wind turbine under the presumptive ice-free operating and ambient conditions;

(c) measuring an actual electrical output generated by the wind turbine during operation in the presumptive ice-free state;

(d) comparing the calculated expected electrical output of the wind turbine with the actual electrical output to indicate whether the at least one rotor blade is free of ice in accordance with the comparison of the calculated expected electrical output and the actual electrical output of the wind turbine;

(e) detecting vibrations of the at least one rotor blade during operation of the wind turbine and storing characteristic properties of the detected vibrations as reference properties for the device in the presumptive ice free state; and (f) detecting vibrations of the at least one rotor blade during operation of the wind turbine in a subsequent state and evaluating characteristic properties of the subsequent detected vibrations by comparing the subsequent characteristic properties with the reference properties to indicate that the at least one rotor blade is free of ice in the subsequent state.

2. The method as defined in claim 1, wherein the operating and ambient conditions comprise at least one of a wind speed, an ambient and/or blade temperature, an angle of attack of at least one rotor blade, and a rotational speed of a rotor of the wind turbine.

3. The method as defined in claim 1, in which the calculated expected electrical output is determined using a model that reflects measured power outputs at measured operating and ambient conditions.

4. The method as defined in claim 3, in which the power outputs of a further wind turbine comparable to the wind turbine are measured.

5. The method as defined in claim 3, in which the power outputs are measured at the wind turbine itself.

6. The method as defined in claim 1, wherein in said comparing step, a quotient is formed between the actual electrical output and the calculated expected electrical output of the wind turbine and said quotient is compared with a predetermined threshold value.

7. The method as defined in claim 6, wherein the at least one rotor blade is indicated as being free of ice when the threshold is exceeded.

8. The method as defined in claim 7, wherein the threshold is between 60% and 95%.

9. The method as defined in claim 1, wherein the characteristic properties of the vibrations relate to a frequency and/or amplitude of a vibration state.

10. The method as defined in claim 9, wherein the vibration state corresponds to that of a maximum in a vibration spectrum of the vibrations.

11. The method as defined in claim 1, wherein the characteristic properties of the vibrations relate to at least one frequency range from a spectrum of the vibrations.

12. Apparatus for detecting an accumulation of ice on at least one rotor blade of a wind turbine, comprising a monitoring device in which ice is detected on the basis of natural vibration measurements on the at least one rotor blade, said monitoring device including an evaluation unit configured to implement the teaching method according claim 1.

* * * * *